US012792388B2

(12) United States Patent
Endo

(10) Patent No.: US 12,792,388 B2
(45) Date of Patent: Nov. 10, 2026

(54) IN-VEHICLE CONTROL DEVICE, CONTROL METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Masahiro Endo, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 322 days.

(21) Appl. No.: 18/718,483

(22) PCT Filed: Nov. 24, 2022

(86) PCT No.: PCT/JP2022/043302

§ 371 (c)(1),
(2) Date: Jun. 11, 2024

(87) PCT Pub. No.: WO2023/112623

PCT Pub. Date: Jun. 22, 2023

(65) Prior Publication Data

US 2026/0259757 A1 Sep. 3, 2026

(30) Foreign Application Priority Data

Dec. 13, 2021 (JP) ................................ 2021-201775

(51) Int. Cl.
*G06F 9/455* (2018.01)
*G06F 9/54* (2006.01)

(52) U.S. Cl.
CPC .......... *G06F 9/45558* (2013.01); *G06F 9/544* (2013.01); *G06F 2009/45583* (2013.01)

(58) Field of Classification Search
None
See application file for complete search history.

(56) References Cited

U.S. PATENT DOCUMENTS 6,934,051 B1 8/2005 Ogura
2009/0043927 A1 2/2009 Inoue et al.
(Continued)

FOREIGN PATENT DOCUMENTS

DE 4435183 C2 * 4/2000 ............ G01R 33/54

OTHER PUBLICATIONS

International Search Report, Application No. PCT/JP2022/043302, mailed Feb. 14, 2023. ISA/Japan Patent Office.

*Primary Examiner* — Peter D Nolan
*Assistant Examiner* — Jacob Kent Besteman-Street
(74) *Attorney, Agent, or Firm* — Brooks Kushman P.C.

(57) ABSTRACT

In an in-vehicle control device configured to perform data transmission and reception between a plurality of virtual control devices with use of a circular buffer, the circular buffer includes a plurality of blocks. A virtual control device (a first virtual control device) writes data into the buffer and two virtual control devices (a second virtual control device and a third virtual control device) read data from the buffer. The plurality of blocks include: first blocks for which overwriting is prohibited when unread data remains in the blocks; and second blocks for which overwriting is not prohibited. If data that has not been read by the second or third virtual control device remains in all first blocks, switching control is executed to write data into a second block.

11 Claims, 9 Drawing Sheets

(56) References Cited

U.S. PATENT DOCUMENTS

| | | | |
|---|---|---|---|
| 2019/0130760 | A1 | 5/2019 | Nishimura et al. |
| 2020/0293353 | A1 | 9/2020 | Yamaura et al. |

* cited by examiner

FIG. 7

| Data | Destination | | Type of data | Writing target region | | Predetermined value | |
|---|---|---|---|---|---|---|---|
| | Virtual control device 22 | Virtual control device 23 | | First block | Second block | Stopped | Driving |
| D1 | 1 | 1 | Control data | 1 | 1 | 3 | 1 |
| D2 | 1 | 1 | Control data | 1 | 0 | 3 | 1 |
| D3 | 0 | 1 | Control data | 1 | 0 | 3 | 1 |
| D4 | 0 | 1 | Control data | 1 | 0 | 3 | 1 |
| D5 | 1 | 0 | Driving data | 1 | 0 | 2 | 1 |
| D6 | 1 | 0 | Driving data | 0 | 1 | 2 | 1 |
| D7 | 0 | 1 | Update data | 1 | 0 | 8 | 8 |
| D8 | 1 | 0 | Update data | 1 | 0 | 255 | 255 |
| ⋮ | ⋮ | ⋮ | ⋮ | ⋮ | ⋮ | ⋮ | ⋮ |

IN-VEHICLE CONTROL DEVICE, CONTROL METHOD, AND COMPUTER PROGRAM

CROSS-REFERENCE TO RELATED APPLICATIONS

This application is the U.S. national stage of PCT/JP2022/043302 filed on Nov. 24, 2022, which claims priority of Japanese Patent Application No. JP 2021-201775 filed on Dec. 13, 2021, the contents of which are incorporated herein.

TECHNICAL FIELD

The present disclosure relates to an in-vehicle control device, a control method, and a computer program.

BACKGROUND

Virtualization technologies for configuring a single computer as a plurality of computers are conventionally known. For example, 2019-179397A discloses a technology for generating a plurality of virtual machines by dynamically allocating a multi-core CPU with use of a hypervisor to improve the efficiency of an electronic control device installed in a vehicle.

Also, Patent Document 2 discloses a technology for storing a descriptor ring having a ring buffer structure for a data storage unit to transmit or receive frames, in relation to management and control of virtual machines.

When data is transmitted and received between a plurality of virtual control devices (e.g., virtual machines), the data transmission and reception between normal virtual control devices may be delayed due to an abnormality occurring in another virtual control device. Therefore, as the number of virtual control devices generated by a single in-vehicle control device with use of virtualization technologies increases, the risk of data transmission and reception being delayed due to abnormalities increases, and the reliability of the in-vehicle control device may decrease.

The present disclosure was made in view of the above circumstances, and has an object of further improving reliability of an in-vehicle control device including a plurality of virtual control devices.

SUMMARY

An in-vehicle control device according to the present disclosure is an in-vehicle control device installed in a vehicle and includes: physical resources including a control unit and a storage unit; and a management unit configured to generate a plurality of virtual control devices by allocating the physical resources, wherein the management unit includes a buffer for temporarily storing data that is transmitted from a first virtual control device of the plurality of virtual control devices and to be received by at least one of a second virtual control device and a third virtual control device of the plurality of virtual control devices, the buffer is partitioned into a plurality of blocks through which a writing pointer, a first reading pointer, and a second reading pointer each circulate, the writing pointer indicating a position at which data transmitted from the first virtual control device to the buffer is written, the first reading pointer indicating a position at which data to be transmitted from the buffer to the second virtual control device is read, and the second reading pointer indicating a position at which data to be transmitted from the buffer to the third virtual control device is read, the plurality of blocks include first blocks for which overwriting of data is prohibited, and second blocks for which overwriting of data is allowed, each of the first blocks includes: a first reception flag that is set in response to data from the first virtual control device being written and is reset in response to the data being read by the second virtual control device; and a second reception flag that is set in response to data from the first virtual control device being written and is reset in response to the data being read by the third virtual control device, the management unit executes switching control for writing data transmitted from the first virtual control device into a second block when a writing target region of the data transmitted from the first virtual control device is a first block, and the switching control is executed when at least one of the first reception flag and the second reception flag has been set in all of the first blocks included in the buffer.

A control method according to the present disclosure is a control method for controlling an in-vehicle control device installed in a vehicle and includes: a generating step of generating a plurality of virtual control devices by allocating physical resources including a control unit and a storage unit; and a storing step of temporarily storing, in a buffer, data that is transmitted from a first virtual control device of the plurality of virtual control devices and to be received by at least one of a second virtual control device and a third virtual control device of the plurality of virtual control devices, wherein the buffer is partitioned into a plurality of blocks through which a writing pointer, a first reading pointer, and a second reading pointer each circulate, the writing pointer indicating a position at which data transmitted from the first virtual control device to the buffer is written, the first reading pointer indicating a position at which data to be transmitted from the buffer to the second virtual control device is read, and the second reading pointer indicating a position at which data to be transmitted from the buffer to the third virtual control device is read, the plurality of blocks include first blocks for which overwriting of data is prohibited and second blocks for which overwriting of data is allowed, each of the first blocks includes: a first reception flag that is set in response to data from the first virtual control device being written and is reset in response to the data being read by the second virtual control device; and a second reception flag that is set in response to data from the first virtual control device being written and is reset in response to the data being read by the third virtual control device, the storing step includes a switching step of writing data transmitted from the first virtual control device into a second block when a writing target region of the data transmitted from the first virtual control device is a first block, and the switching step is executed when at least one of the first reception flag and the second reception flag has been set in all of the first blocks included in the buffer.

A computer program according to the present disclosure is a computer program for controlling an in-vehicle control device installed in a vehicle and causes a computer to execute: a generating step of generating a plurality of virtual control devices by allocating physical resources including a control unit and a storage unit; and a storing step of temporarily storing, in a buffer, data that is transmitted from a first virtual control device of the plurality of virtual control devices and to be received by at least one of a second virtual control device and a third virtual control device of the plurality of virtual control devices, wherein the buffer is partitioned into a plurality of blocks through which a writing pointer, a first reading pointer, and a second reading pointer each circulate, the writing pointer indicating a position at which data transmitted from the first virtual control device to the buffer is written, the first reading pointer indicating a position at which data to be transmitted from the buffer to the second virtual control device is read, and the second reading pointer indicating a position at which data to be transmitted from the buffer to the third virtual control device is read, the plurality of blocks include first blocks for which overwriting of data is prohibited and second blocks for which overwriting of data is allowed, each of the first blocks includes: a first reception flag that is set in response to data from the first virtual control device being written and is reset in response to the data being read by the second virtual control device; and a second reception flag that is set in response to data from the first virtual control device being written and is reset in response to the data being read by the third virtual control device, the storing step includes a switching step of writing data transmitted from the first virtual control device into a second block when a writing target region of the data transmitted from the first virtual control device is a first block, and the switching step is executed when at least one of the first reception flag and the second reception flag has been set in all of the first blocks included in the buffer.

Advantageous Effects

According to the present disclosure, it is possible to further improve reliability of an in-vehicle control device including a plurality of virtual control devices.

BRIEF DESCRIPTION OF DRAWINGS

FIG. 7 is a table showing an example of data according to an embodiment.

DETAILED DESCRIPTION OF PREFERRED EMBODIMENTS

Figure 1:
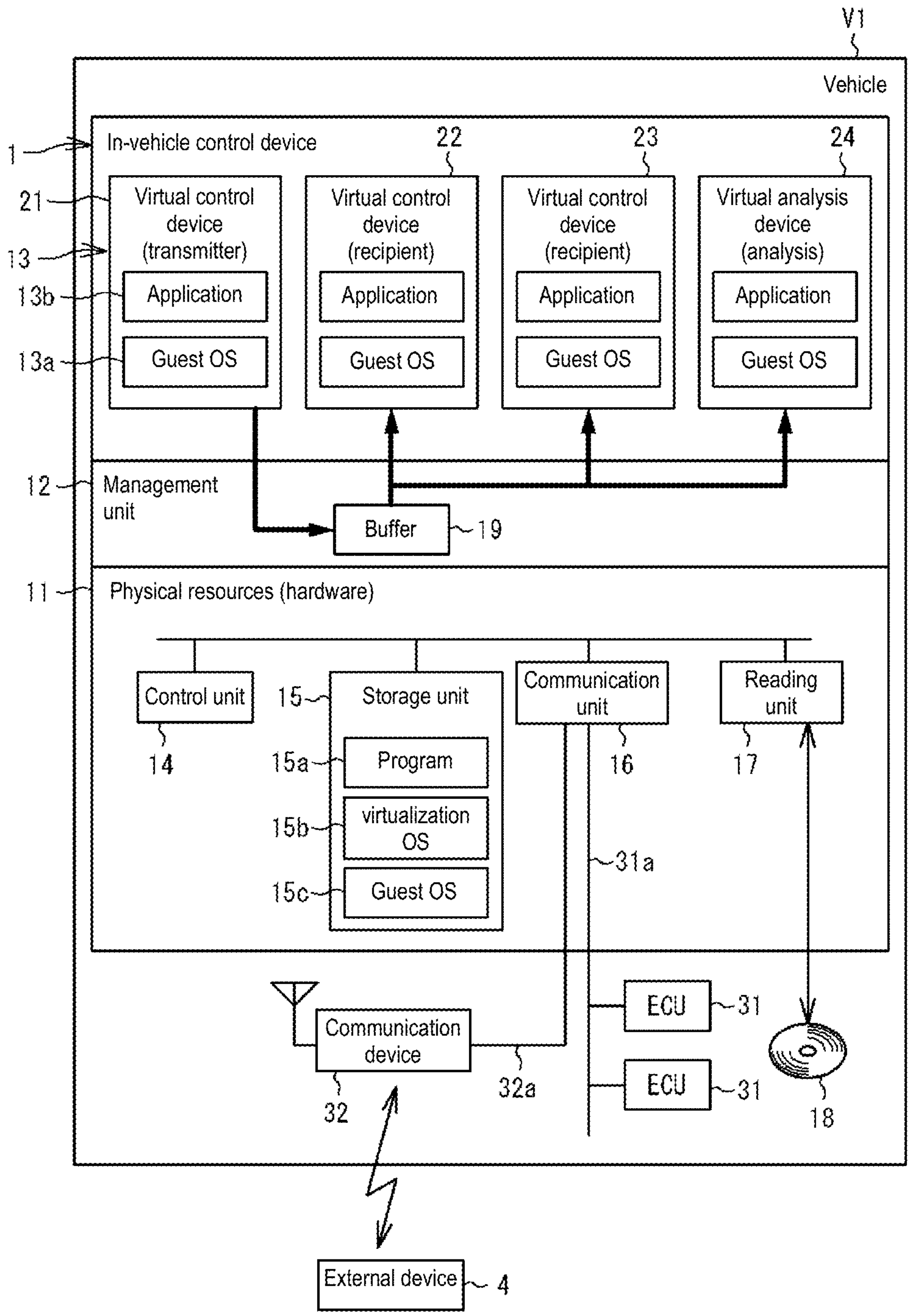
FIG. 1 is a schematic diagram showing an example of an in-vehicle control device according to an embodiment and a surrounding configuration.

The following describes summaries of embodiments of the present disclosure.

An in-vehicle control device according to the present disclosure is an in-vehicle control device installed in a vehicle and includes: physical resources including a control unit and a storage unit; and a management unit configured to generate a plurality of virtual control devices by allocating the physical resources, wherein the management unit includes a buffer for temporarily storing data that is transmitted from a first virtual control device of the plurality of virtual control devices and to be received by at least one of a second virtual control device and a third virtual control device of the plurality of virtual control devices, the buffer is partitioned into a plurality of blocks through which a writing pointer, a first reading pointer, and a second reading pointer each circulate, the writing pointer indicating a position at which data transmitted from the first virtual control device to the buffer is written, the first reading pointer indicating a position at which data to be transmitted from the buffer to the second virtual control device is read, and the second reading pointer indicating a position at which data to be transmitted from the buffer to the third virtual control device is read, the plurality of blocks include first blocks for which overwriting of data is prohibited, and second blocks for which overwriting of data is allowed, each of the first blocks includes: a first reception flag that is set in response to data from the first virtual control device being written and is reset in response to the data being read by the second virtual control device; and a second reception flag that is set in response to data from the first virtual control device being written and is reset in response to the data being read by the third virtual control device, the management unit executes switching control for writing data transmitted from the first virtual control device into a second block when a writing target region of the data transmitted from the first virtual control device is a first block, and the switching control is executed when at least one of the first reception flag and the second reception flag has been set in all of the first blocks included in the buffer.

The switching control makes it possible to write the latest data into the buffer by switching the region into which the data is written to a second block, in a case where the writing target region of the data is a first block but the writing pointer would otherwise circulate through the first blocks (or the writing pointer stops moving from a predetermined block) without writing the data because data is not normally read from the first blocks.

By executing the switching control, the management unit can store data transmitted from the first virtual control device (in particular, data for which transmission in real time is important) in a second block of the buffer while maintaining continuity of data stored in the first blocks. Also, a normally operating device out of the second virtual control device and the third virtual control device can read the data from the second block. Therefore, even if an abnormality occurs in the third virtual control device, for example, it is possible to continue data transmission and reception between the first virtual control device and the second virtual control device. Consequently, the reliability of the in-vehicle control device including the plurality of virtual control devices can be improved.

Each of the first blocks may further include an alive flag that is set to a number corresponding to the number of times the writing pointer has pointed to the first block, and is reset in response to both the first reception flag and the second reception flag being reset, and the management unit may execute the switching control when the alive flag of the first block has been set to a number larger than a predetermined value.

By using the alive flag and the predetermined value, it is possible to determine whether or not data that has not been read for a long period of time is stored in the first block. In the configuration in which the management unit executes the switching control if data that has not been read for a long period of time is stored in the first block, it is possible to appropriately maintain data transmission and reception between the plurality of virtual control devices by basically using the first blocks, in which continuity of data is maintained, and using the second blocks in the event of an abnormality or the like.

The management unit may determine the predetermined value in accordance with a state of the vehicle.

Whether or not it is necessary to transmit data in real time may change depending on the state of the vehicle. When the predetermined value is determined in accordance with the state of the vehicle, it is possible to more appropriately determine whether or not to execute the switching control, and therefore, it is possible to further improve the reliability of the in-vehicle control device.

The management unit may set the predetermined value to a first value when the vehicle is in a stopped state, and set the predetermined value to a second value that is smaller than the first value when the vehicle is in a driving state.

This configuration makes the switching control more likely to be executed in the driving state, and therefore, it is possible to more appropriately maintain transmission and reception of the latest data between the plurality of virtual control devices.

The management unit may set the predetermined value to a value larger than or equal to the maximum value of the alive flag when data transmitted from the first virtual control device is update data for updating the in-vehicle control device, diagnosis data for diagnosing the in-vehicle control device, or audio or video streaming data.

In this configuration, the management unit does not execute the switching control for data such as update data, whose continuity is important, and therefore, it is possible to maintain continuity of data such as update data while maintaining transmission and reception of data for which transmission in real time is important. Accordingly, the reliability of the in-vehicle control device can be further improved.

The plurality of virtual control devices may include a virtual analysis device for analyzing an abnormality occurring in at least one of the second virtual control device and the third virtual control device, and when the alive flag of the first block has been set to a number larger than the predetermined value, the management unit may read data stored in the first block and transmit the data to the virtual analysis device.

If the alive flag of the first block has been set to a number larger than the predetermined value, the data stored in the first block is data to be read by a virtual control device having an abnormality, and therefore, the data can be used to analyze the abnormality. By transmitting such data to the virtual analysis device, the management unit can increase the accuracy of abnormality analysis.

The management unit may select a first block or a second block as the writing target region depending on the type of data transmitted from the first virtual control device.

With this configuration, it is possible to appropriately select the writing target region in accordance with the type of data.

The management unit may select a second block as the writing target region when data transmitted from the first virtual control device is data regarding control of the vehicle.

Transmission in real time tends to be more important for data regarding control of the vehicle, and therefore, by selecting a second block as the writing target region for such data, it is possible to more reliably maintain transmission and reception of the latest data.

The management unit may select a first block as the writing target region when data transmitted from the first virtual control device is update data for updating the in-vehicle control device, diagnosis data for diagnosing the in-vehicle control device, or audio or video streaming data.

Continuity of data tends to be more important for data such as update data, and therefore, by selecting a first block as the writing target region for such data, it is possible to more reliably maintain continuity of the data.

A control method according to the present disclosure is a control method for controlling an in-vehicle control device installed in a vehicle and includes: a generating step of generating a plurality of virtual control devices by allocating physical resources including a control unit and a storage unit; and a storing step of temporarily storing, in a buffer, data that is transmitted from a first virtual control device of the plurality of virtual control devices and to be received by at least one of a second virtual control device and a third virtual control device of the plurality of virtual control devices, wherein the buffer is partitioned into a plurality of blocks through which a writing pointer, a first reading pointer, and a second reading pointer each circulate, the writing pointer indicating a position at which data transmitted from the first virtual control device to the buffer is written, the first reading pointer indicating a position at which data to be transmitted from the buffer to the second virtual control device is read, and the second reading pointer indicating a position at which data to be transmitted from the buffer to the third virtual control device is read, the plurality of blocks include first blocks for which overwriting of data is prohibited and second blocks for which overwriting of data is allowed, each of the first blocks includes: a first reception flag that is set in response to data from the first virtual control device being written and is reset in response to the data being read by the second virtual control device; and a second reception flag that is set in response to data from the first virtual control device being written and is reset in response to the data being read by the third virtual control device, the storing step includes a switching step of writing data transmitted from the first virtual control device into a second block when a writing target region of the data transmitted from the first virtual control device is a first block, and the switching step is executed when at least one of the first reception flag and the second reception flag has been set in all of the first blocks included in the buffer.

By executing the switching step, it is possible to store data transmitted from the first virtual control device (in particular, data for which transmission in real time is important) in a second block of the buffer while maintaining continuity of data stored in the first blocks. Also, a normally operating device out of the second virtual control device and the third virtual control device can read the data from the second block. Therefore, even if an abnormality occurs in the third virtual control device, for example, it is possible to continue data transmission and reception between the first virtual control device and the second virtual control device. Consequently, the reliability of the in-vehicle control device including the plurality of virtual control devices can be improved.

A computer program according to the present disclosure is a computer program for controlling an in-vehicle control device installed in a vehicle and causes a computer to execute: a generating step of generating a plurality of virtual control devices by allocating physical resources including a control unit and a storage unit; and a storing step of temporarily storing, in a buffer, data that is transmitted from a first virtual control device of the plurality of virtual control devices and to be received by at least one of a second virtual control device and a third virtual control device of the plurality of virtual control devices, wherein the buffer is partitioned into a plurality of blocks through which a writing pointer, a first reading pointer, and a second reading pointer each circulate, the writing pointer indicating a position at which data transmitted from the first virtual control device to the buffer is written, the first reading pointer indicating a position at which data to be transmitted from the buffer to the second virtual control device is read, and the second reading pointer indicating a position at which data to be transmitted from the buffer to the third virtual control device is read, the plurality of blocks include first blocks for which overwriting of data is prohibited and second blocks for which overwriting of data is allowed, each of the first blocks includes: a first reception flag that is set in response to data from the first virtual control device being written and is reset in response to the data being read by the second virtual control device; and a second reception flag that is set in response to data from the first virtual control device being written and is reset in response to the data being read by the third virtual control device, the storing step includes a switching step of writing data transmitted from the first virtual control device into a second block when a writing target region of the data transmitted from the first virtual control device is a first block, and the switching step is executed when at least one of the first reception flag and the second reception flag has been set in all of the first blocks included in the buffer.

By executing the switching step, it is possible to store data transmitted from the first virtual control device (in particular, data for which transmission in real time is important) in a second block of the buffer while maintaining continuity of data stored in the first blocks. Also, a normally operating device out of the second virtual control device and the third virtual control device can read the data from the second block. Therefore, even if an abnormality occurs in the third virtual control device, for example, it is possible to continue data transmission and reception between the first virtual control device and the second virtual control device. Consequently, the reliability of the in-vehicle control device including the plurality of virtual control devices can be improved.

The following describes details of embodiments of the present disclosure with reference to the drawings.

In-Vehicle Control Device and Surrounding Configuration

FIG. 1 is a schematic diagram showing an in-vehicle control device 1 according to the present embodiment and a surrounding configuration.

The in-vehicle control device 1 is installed in a vehicle V1 and also called an ECU (Electronic Control Unit). The vehicle V1 is an automobile, for example, but there is no limitation on the type of vehicle V1. In addition to the in-vehicle control device 1, a plurality of other ECUs 31 and a communication device 32 are installed in the vehicle V1.

The ECUs 31 are devices (operation-system ECUs) for controlling units (e.g., a braking device, a door, a battery, an air conditioner, etc.) of the vehicle V1, for example. There is no particular limitation on the functions of the ECUs 31, and the ECUs 31 may also be devices (recognition-system ECUs) that are connected to existing sensors (not shown) and monitor the state of the units of the vehicle V1. The plurality of ECUs 31 are connected to a communication unit 16, which will be described later, for example.

The communication device 32 is a TCU (Telematics Communication Unit), for example, and wirelessly communicates with an external device 4 via a network such as the Internet. The communication device 32 is connected to the communication unit 16, which will be described later, for example.

The external device 4 is a server including a control unit, a storage unit, and a communication unit, for example. For example, programs or data for controlling the in-vehicle control device 1 and the ECUs 31 is stored in the storage unit of the external device 4. The manufacturer of the in-vehicle control device 1 or the ECUs 31 modifies the programs or data as necessary, and stores the modified programs or data in the storage unit of the external device 4 as required, for example. The communication unit of the external device 4 transmits the modified programs or data as update data to the communication device 32.

The in-vehicle control device 1 is an ECU that functions as a plurality of virtual control devices 13 by using a virtualization technology, which will be described later. That is, the in-vehicle control device 1 is an integrated ECU that functions as a plurality of virtual ECUs. There is no particular limitation on the functions of the plurality of virtual control devices 13. For example, the virtual control devices 13 may relay update data input from the communication device 32 to the ECUs 31. In this case, similarly to a central gateway (CGW), for example, if the network environment of the vehicle V1 includes a plurality of different LANs (Local Area Networks), the virtual control devices 13 may relay data transmitted or received by each of a plurality of ECUs 31 included in the LANs. Alternatively, the virtual control devices 13 may control units of the vehicle V1 or monitor the state of those units of the vehicle V1, similarly to the ECUs 31 described above.

Internal Configuration of In-Vehicle Control Device

The in-vehicle control device 1 includes various physical resources 11 and a management unit 12 that generates the plurality of virtual control devices 13 by allocating the physical resources 11. The physical resources 11 include a control unit 14, a storage unit 15, the communication unit 16, and a reading unit 17. The control unit 14, the storage unit 15, the communication unit 16, and the reading unit 17 are electrically connected to each other via a bus, for example.

The control unit 14 is a CPU (Central Processing Unit), for example. The control unit 14 may be a GPU (Graphics Processing Unit) or an integrated circuit such as an FPGA (Field-Programmable Gate Array).

The storage unit 15 includes a volatile memory and a non-volatile memory, and various types of data are stored in the storage unit. The volatile memory is a RAM (Random Access Memory), for example. The non-volatile memory includes a flash memory, an HDD (Hard Disk Drive), an SSD (Solid State Drive), a ROM (Read Only Memory), or the like, for example.

The storage unit 15 stores a computer program 15*a*, a virtualization operating system 15*b* (hereinafter referred to as a "virtualization OS 15*b*"), and a guest operating system 15*c* (hereinafter referred to as a "guest OS 15*c*") in the non-volatile memory, for example.

The reading unit 17 reads information from a computer-readable recording medium 18. The recording medium 18 is an optical disk such as a CD or a DVD, or a USB flash memory, for example. The reading unit 17 is an optical drive or a USB terminal, for example. A plurality of computer programs 15*a*, the virtualization OS 15*b*, and a plurality of guest OSs 15*c* are recorded in the recording medium 18, and are stored in the non-volatile memory of the storage unit 15 as a result of the recording medium 18 being read by the reading unit 17.

The plurality of computer programs 15*a* include a program for realizing functions of the management unit 12 and programs (application programs) for realizing applications 13*b*, which will be described later, in the plurality of virtual control devices 13.

The plurality of guest OSs 15*c* are operating systems for causing the virtual control devices 13 to operate. The guest OSs 15*c* are not particularly limited, and may be Autosar (registered trademark), Linux (registered trademark), Android (registered trademark), QNX (registered trademark), or Ubuntu (registered trademark), for example.

Note that the plurality of computer programs 15*a*, the virtualization OS 15*b*, and the plurality of guest OSs 15*c* may be transmitted from the external device 4 and stored in the storage unit 15 via the communication device 32 and the communication unit 16.

The communication unit 16 includes a first communication interface connected to the plurality of ECUs 31 via a communication line 31*a* and a second communication interface connected to the communication device 32 via a communication line 32*a*. Although there is no particular limitation on communication standards used for communication between the communication unit 16 and the plurality of ECUs 31, the communication is performed in accordance with CAN or Ethernet (registered trademark), for example. Also, although there is no particular limitation on communication standards used for communication between the communication unit 16 and the communication device 32, the communication is performed in accordance with CAN or Ethernet, for example.

The control unit 14 reads the computer programs 15*a*, the virtualization OS 15*b*, and the guest OSs 15*c* from the storage unit 15 and executes various types of computation and processing based on the programs 15*a* and the OSs 15*b* and 15*c* to realize various functions, which will be described later. Various operations of the management unit 12 and the plurality of virtual control devices 13 are realized through the computation and processing executed by the control unit 14.

The management unit 12 establishes a plurality of virtual environments in which the plurality of virtual control devices 13 can operate respectively, by allocating the physical resources 11 as appropriate based on the virtualization OS 15*b*. The virtualization OS 15*b* is a Hypervisor (registered trademark), for example. Note that the virtualization OS 15*b* may also be another virtualization software. For example, the virtualization OS 15*b* may be host-type virtualization software or container-type virtualization software.

The plurality of virtual control devices 13 each include virtual hardware configured as a result of the physical resources 11 being allocated as appropriate. The virtual hardware includes a virtual control unit, a virtual storage unit, and a virtual communication unit, for example. The virtual control devices 13 operate as real physical ECUs (like the ECUs 31) by causing guest OSs 13*a* to run on the virtual hardware and causing various applications 13*b* to run in the guest OSs. Each of the guest OSs 13*a* corresponds to a guest OS 15*c* allocated by the management unit 12 from the plurality of guest OSs 15*c* stored in the storage unit 15.

In the example shown in FIG. 1, the management unit 12 generates four virtual control devices 21 to 24 by allocating the physical resources 11. The four virtual control devices 21 to 24 are collectively referred to as the "virtual control devices 13" when they are not distinguished from each other.

The virtual control device 21 is a device that relays various types of data such as update data provided from the external device 4 to the other virtual control devices 22 to 24 and the ECUs 31, for example. The virtual control device 21 may also be a device that receives a signal from an in-vehicle sensor, performs various types of processing on the signal, and then transmits the signal to the other virtual control devices 22 to 24, for example. The virtual control device 21 will also be referred to as a "first virtual control device 21" with focus given to its function of transmitting data to other devices.

The virtual control device 22 is a device that controls operations of units of the vehicle V1 based on data transmitted from the first virtual control device 21, for example. The virtual control device 22 may be a device for adjusting the angle of a mirror of the vehicle V1, for example. The virtual control device 22 will also be referred to as a "second virtual control device 22" with focus given to its function of receiving data from other devices.

The virtual control device 23 is a device that monitors the state of units of the vehicle V1 based on data transmitted from the first virtual control device 21, for example. The virtual control device 23 may be a device that monitors the temperature or pressure of an engine room, for example. The virtual control device 23 will also be referred to as a "third virtual control device 23" with focus given to its function of receiving data from other devices.

The virtual control device 24 is a device for analyzing abnormalities occurring in the other virtual control devices 21 to 23, for example. When data that has not been read for a long period of time is stored in the buffer 19, the virtual control device 24 reads the data, analyzes contents of the data, and analyzes causes of an abnormality occurring in any of the virtual control devices 21 to 23, for example. In the following description, the virtual control device 24 will also be referred to as a "virtual analysis device 24" with focus given to its function of analyzing abnormalities.

The management unit 12 includes the buffer 19 for temporarily storing data transmitted and received between the plurality of virtual control devices 13. The buffer 19 is constituted by a RAM that is shared by the plurality of virtual control devices 13, for example.

Figure 2:
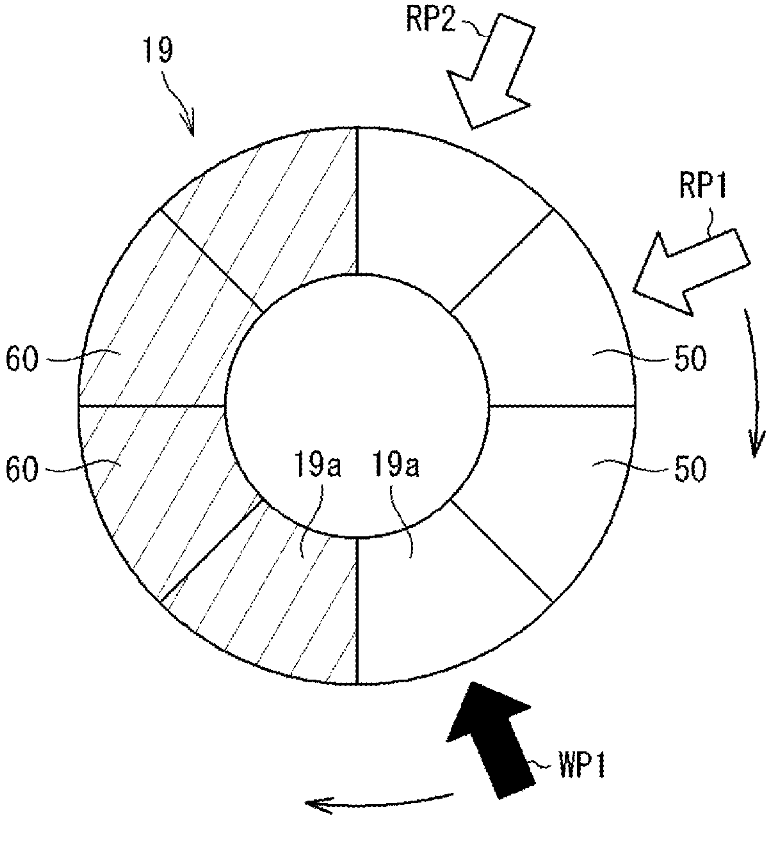
FIG. 2 is a schematic diagram showing an example of a buffer according to an embodiment.

FIG. 2 is a schematic diagram showing an example of the buffer 19 according to this embodiment. The buffer 19 is partitioned into a plurality of (eight in FIG. 2) blocks 19*a* in which data are respectively stored. The buffer 19 includes a writing pointer WP1, a first reading pointer RP1, and a second reading pointer RP2.

The writing pointer WP1 indicates a position at which data transmitted from the first virtual control device 21 to the buffer 19 is written. The writing pointer WP1 moves to the next block 19*a* every time predetermined processing such as data writing into a block 19*a* is performed, for example.

The first reading pointer RP1 indicates a position at which data to be transmitted from the buffer 19 to the second virtual control device 22 is read out. The second reading pointer RP2 indicates a position at which data to be transmitted from the buffer 19 to the third virtual control device 23 is read out. The first and second reading pointers RP1 and RP2 move to the next block 19*a* every time predetermined processing such as data reading from a block 19*a* is performed, for example.

The writing pointer WP1, the first reading pointer RP1, and the second reading pointer RP2 each independently circulate through the plurality of blocks 19*a* by returning to the first block 19*a* after pointing to the last block 19*a*. That is to say, the buffer 19 is a "ring buffer". Note that the buffer 19 includes other pointers such as a reading pointer indicating a position at which data to be transmitted from the buffer 19 to the virtual analysis device 24 is read out, but such pointers are not illustrated in FIG. 2 to simplify the description.

Problem to be Solved by the Present Disclosure

Figure 3:
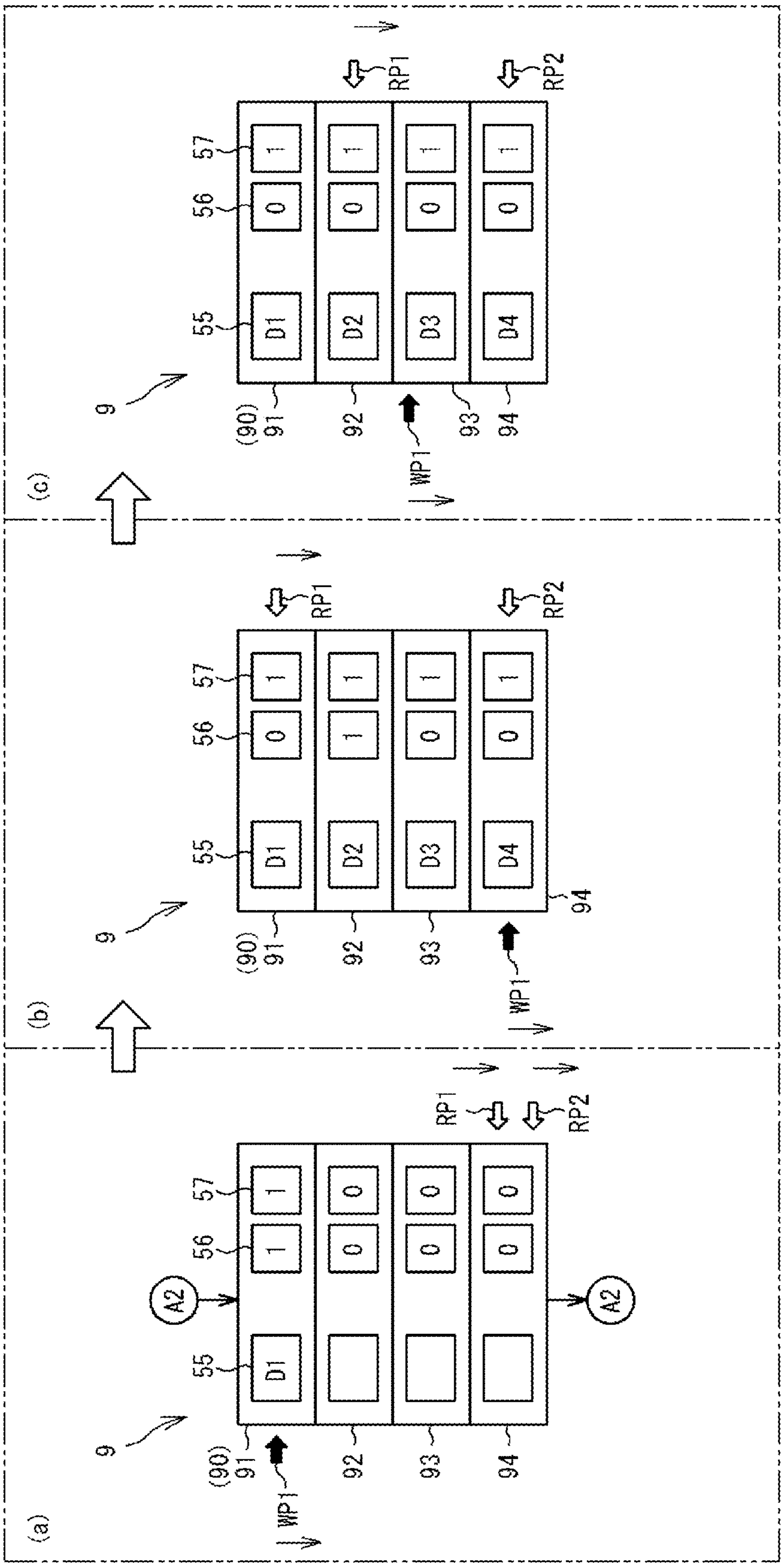
FIG. 3 shows a problem to be solved by the present disclosure.

FIG. 3 shows a problem to be solved by the present disclosure. FIG. 3 shows an example in which a buffer 9 including four blocks 90 is used instead of the buffer 19 shown in FIG. 1. The four blocks 90 will be referred to as blocks 91, 92, 93, and 94 from the first block when they are distinguished from each other. As indicated by the arrows A2, the last block 94 is connected to the first block 91.

When data transmitted and received between a plurality of virtual control devices 13 is temporarily stored in the buffer 9, the buffer 9 is shared by the plurality of virtual control devices 13. Therefore, in order to prevent a situation in which writing and reading by the plurality of virtual control devices 13 compete with each other in the buffer 9, it is conceivable to perform exclusive control with use of semaphores, for example.

However, if the second reading pointer RP2 stops moving due to abnormalities in the third virtual control device 23 (i.e., any virtual control device 13 that receives data), for example, while exclusive control is performed, there is a risk that data transmission and reception between the other virtual control devices 21 and 22 may also stop. That is, in an integrated ECU including a plurality of virtual ECUs, physical resources are shared by the plurality of virtual ECUs, and accordingly, there is a risk that the integrated ECU may not operate efficiently due to an abnormality occurring in any of the virtual ECUs affecting the other virtual ECUs. The following describes specific examples of the exclusive control and the problem.

Each of the four blocks 90 includes a data storage unit 55, a first reception flag 56, and a second reception flag 57. The data storage unit 55 is a region in which data transmitted from the first virtual control device 21 is stored in accordance with a predetermined data format, for example.

The reception flags 56 and 57 have a function of prohibiting the writing pointer WP1 from writing data into the block 90 and a function of informing the reading pointers RP1 and RP2 that data that needs to be read is stored in the data storage unit 55. The first reception flag 56 is set in response to data transmitted from the first virtual control device 21 being written, and is reset in response to the data being read by the second virtual control device 22, which is the recipient. The second reception flag 57 is set in response to data transmitted from the first virtual control device 21 being written, and is reset in response to the data being read by the third virtual control device 23, which is the recipient.

When at least one of the first reception flag 56 and the second reception flag 57 has been set in the block 90, there is data that has not been read in the data storage unit 55. Therefore, when at least one of the first reception flag 56 and the second reception flag 57 has been set in the block 91, for example, the management unit 12 prohibits the writing pointer WP1 from writing data into the block 91.

On the other hand, when both the first reception flag 56 and the second reception flag 57 have not been set in the block 91, the management unit 12 allows the writing pointer WP1 to write data into the block 91. That is, the management unit 12 prohibits or allows overwriting data in each block 90 based on the reception flags 56 and 57.

The following describes data writing into the buffer 9 and data reading from the buffer 9 with reference to FIG. 3. FIGS. 3(*a*), (*b*), and (*c*) show states of the buffer 9 in time series. In the example shown in FIGS. 3, the buffer 9 receives data D1 to D5 in this order from the first virtual control device 21. The data D1 and D2 are transmitted to both of the virtual control devices 22 and 23. The data D3 and D4 are transmitted to only the third virtual control device 23. The data D5 is transmitted to only the second virtual control device 22.

First, as shown in FIG. 3(*a*), the management unit 12 writes the data D1 transmitted from the first virtual control device 21 into the data storage unit 55 of the block 91, which is pointed to by the writing pointer WP1. The data D1 is transmitted to both of the virtual control devices 22 and 23, and accordingly, the management unit 12 sets both of the reception flags 56 and 57 for the virtual control devices 22 and 23 from "0" to "1" in response to the data D1 being written. When the data D1 is written into the data storage unit 55, the management unit 12 moves the writing pointer WP1 to the next block so that the writing pointer WP1 points to the block 92.

Subsequently, as shown in FIG. 3(*b*), the management unit 12 sequentially stores the data D2, D3, and D4 into the data storage units 55 of the blocks 92, 93, and 94, respectively, as the writing pointer WP1 sequentially points to the blocks 92, 93, and 94. At this time, the management unit 12 sets both of the reception flags 56 and 57 of the block 92 from "0" to "1" in response to the data D2 being written. Also, since the data D3 and D4 are transmitted to only the third virtual control device 23, the management unit 12 sets the second reception flags 57 of the blocks 93 and 94 from "0" to "1" in response to the data D3 and D4 being written.

As shown in FIG. 3(*b*), the management unit 12 reads the data D1 from the data storage unit 55 of the block 91, which is pointed to by the first reading pointer RP1, and transmits the data D1 to the second virtual control device 22. In response to the data D1 being read and transmitted to the second virtual control device 22, the management unit 12 resets the first reception flag 56 from "1" to "0". Thereafter, the management unit 12 moves the first reading pointer RP1 to the next block so that the first reading pointer RP1 points to the block 92.

Subsequently, as shown in FIG. 3(*c*), the management unit 12 sequentially reads data from blocks in which the first reception flag 56 has been set out of the blocks 92, 93, and 94 as the first reading pointer RP1 sequentially points to the blocks 92, 93, and 94. In the example shown in FIGS. 3, the management unit 12 reads the data D2 stored in the data storage unit 55 of the block 92, transmits the data D2 to the second virtual control device 22, and resets the first reception flag 56 of the block 92 from "1" to "0". Since the first reception flag 56 has not been set in the blocks 93 and 94, the management unit 12 moves the first reading pointer RP1 forward without reading the data D3 and D4.

On the other hand, the second reading pointer RP2 does not move from the state shown in FIG. 3(*a*) to the state shown in FIG. 3(*c*). If the third virtual control device 23 needs to perform processing whose priority is higher than that of data reading, for example, data reading processing is suspended in the third virtual control device 23, and the second reading pointer RP2 pointing to a predetermined block 90 may stop moving from that block. Alternatively, if the third virtual control device 23 performs high-load processing or abnormal processing, the second reading pointer RP2 may stop moving due to "slowdown" of the third virtual control device 23.

In this case, the state where the second reception flags 57 of the four blocks 90 cannot be reset continues. If the data D1 to D4 are stored in the respective data storage units 55 in this state, the buffer 9 is filled and the management unit 12 cannot write data D5 into any of the data storage units 55. At this time, the writing pointer WP1 sequentially moves through the blocks 90 without writing the data D5 or stops while pointing to one of the blocks 90.

Also, since the first reception flags 56 of the four blocks 90 have been reset, the second virtual control device 22 cannot receive new data (e.g., the data D5). At this time, the first reading pointer RP1 sequentially moves through the blocks 90 without reading data from the data storage units 55 or stops while pointing to one of the blocks 90.

As described above, if the exclusive control shown in FIG. 3 is adopted in the buffer 9 for data transmission and reception between the plurality of virtual control devices 13, there is a risk that an abnormality occurring in one of the virtual control devices 13 may affect the other, normal virtual control devices 13.

Therefore, the present disclosure proposes a structure, a method, and a computer program for maintaining data transmission and reception between a plurality of normal virtual control devices 13 even if an abnormality occurs in another virtual control device 13. Specifically, second blocks 60 that allow overwriting of data are provided in the buffer 19 in addition to first blocks 50 for executing exclusive control with use of reception flags 56 and 57 like those shown in FIGS. 3.

If the first blocks 50 are filled and new data cannot be written into the first blocks 50 due to an abnormality occurring in any of the virtual control devices 13, for example, switching is performed as necessary to write data into the second blocks 60. With this configuration, data transmission and reception between a plurality of normal virtual control devices 13 is continued with use of the second blocks 60 and kept from being delayed or stopping. Consequently, the reliability of the in-vehicle control device 1 including the plurality of virtual control devices 13 can be further improved.

The following describes a specific means for solving the problem with use of the first blocks 50 and the second blocks 60.

Configuration of Buffer

As shown in FIG. 2, the plurality of blocks 19*a* include first blocks 50 for which overwriting of data is prohibited and second blocks 60 for which overwriting of data is allowed. In the example shown in FIG. 2, the plurality of blocks 19*a* include four first blocks 50 and four second blocks 60, but the numbers of first blocks 50 and second blocks 60 included in the plurality of blocks 19*a* are not particularly limited. Also, in the example shown in FIG. 2, the four first blocks 50 are located on the leading side, and the four second blocks 60 are located on the following side, but there is no particular limitation on the arrangement of the first blocks 50 and the second blocks 60.

Figure 4:
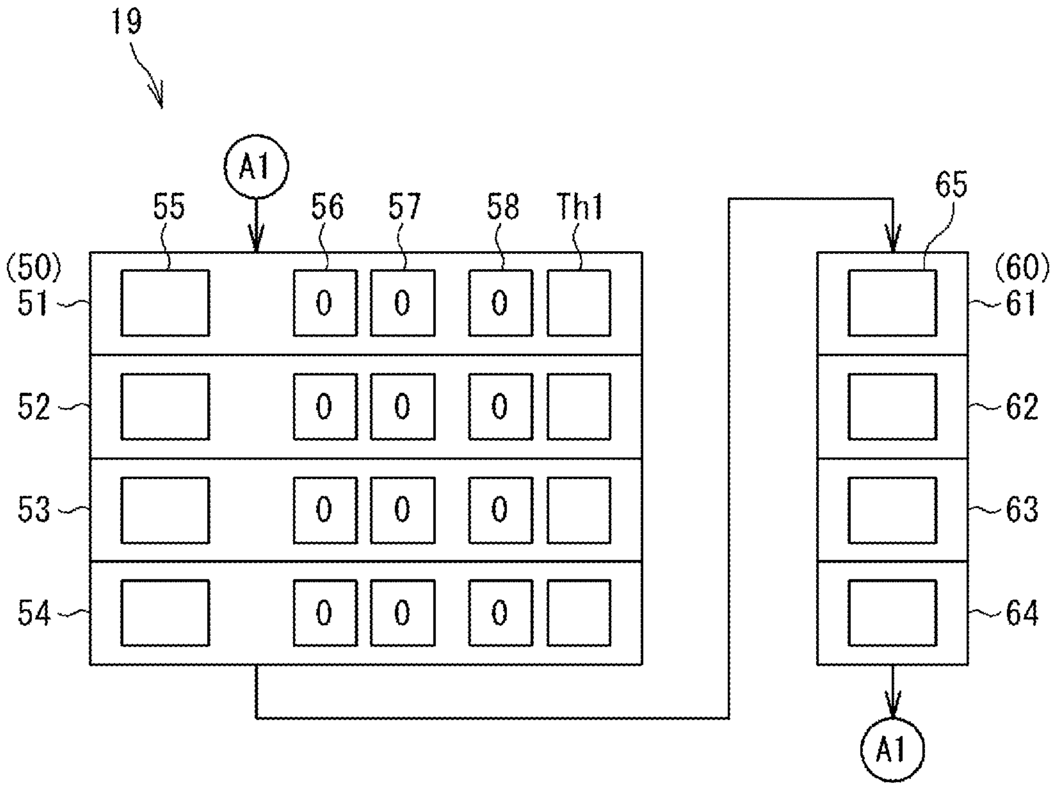
FIG. 4 is a schematic diagram showing details of the buffer in FIG. 2.

FIG. 4 is a schematic diagram showing details of the buffer 19 in FIG. 2. The following describes a specific structure of the buffer 19 with reference to FIG. 4. In the following description, the four first blocks 50 will be referred to as first blocks 51, 52, 53, and 54 in this order from the leading side when they are distinguished from each other. Also, the four second blocks 60 will be referred to as second blocks 61, 62, 63, and 64 in this order from the leading side when they are distinguished from each other. As indicated by the arrows A1, the last second block 64 is connected to the leading first block 51.

Each of the four first blocks 50 includes a data storage unit 55, reception flags 56 and 57, an alive flag 58, and a predetermined value Th1. Functions of the data storage unit 55 and the reception flags 56 and 57 are the same as those described with reference to FIG. 3, and therefore, these are denoted by the same reference numbers as those used in FIG. 3 and descriptions thereof are omitted as appropriate.

The management unit 12 prohibits or allows overwriting of data in the first blocks 50 based on the reception flags 56 and 57. Accordingly, data are maintained in the plurality of first blocks 50 in the order in which the data were stored, i.e., the order from the first block 51 to the first block 54 until the data are read. This data writing method makes it possible to maintain continuity of data while the data is transmitted and received between the plurality of virtual control devices 13. This method is more suitable for a case where the transmitted and received data includes data whose continuity is important. Examples of data whose continuity is important include diagnosis data including time series data, update data for updating an ECU, and streaming data such as audio or video data.

The alive flag 58 is a flag for determining whether or not data that has not been read for a long period of time is stored in the data storage unit 55. The alive flag 58 is set to a number that corresponds to the number of times the writing pointer WP1 has pointed to the first block 50, and is reset in response to data being read by the virtual control device 22 or 23, which is the recipient.

The predetermined value Th1 is a threshold for determining whether or not to execute switching control, which will be described later. The predetermined value Th1 is determined by the management unit 12 in accordance with the state of the vehicle V1, for example. The predetermined value Th1 may be a fixed value determined as a parameter in advance. The predetermined value Th1 may also be stored in a storage region in the management unit 12 other than the first blocks 50.

Each of the four second blocks 60 includes a data storage unit 65. The data storage unit 65 is a region in which data transmitted from the first virtual control device 21 is stored in accordance with a predetermined data format, for example. The second blocks 60 do not include any reception flags 56 and 57, and accordingly, if the writing pointer WP1 is pointing to any of the second blocks 60 when data is to be written, the management unit 12 writes (overwrites) the new data into the data storage unit 65 even if data that has not been read by the virtual control device 22 or 23 is stored in the data storage unit 65.

Note that the second blocks 60 may also include structures corresponding to the reception flags 56 and 57. In this case as well, the management unit 12 writes new data into the data storage unit 65, ignoring contents of the structures. That is, overwriting of data in the second blocks 60 is always allowed.

FIG. 4 shows the buffer 19 in an initial state. In the initial state, the data storage units 55 and 65 of all of the first blocks 50 and the second blocks 60 are empty, and the reception flags 56 and 57 and the alive flags 58 of all of the first blocks 50 have not been set (i.e., "0").

Control Method

Figure 5:
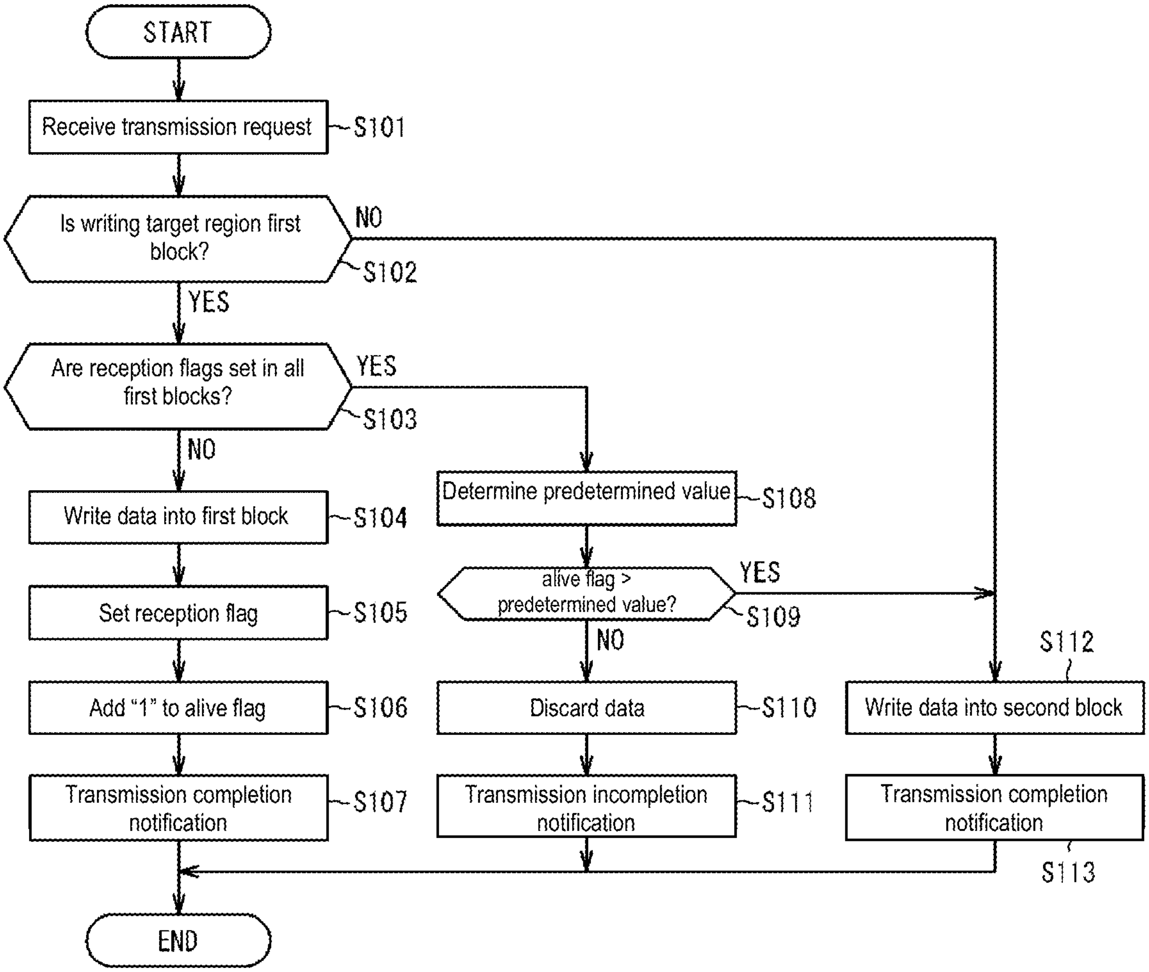
FIG. 5 is a flowchart showing an example of a control method according to an embodiment.
Figure 6:
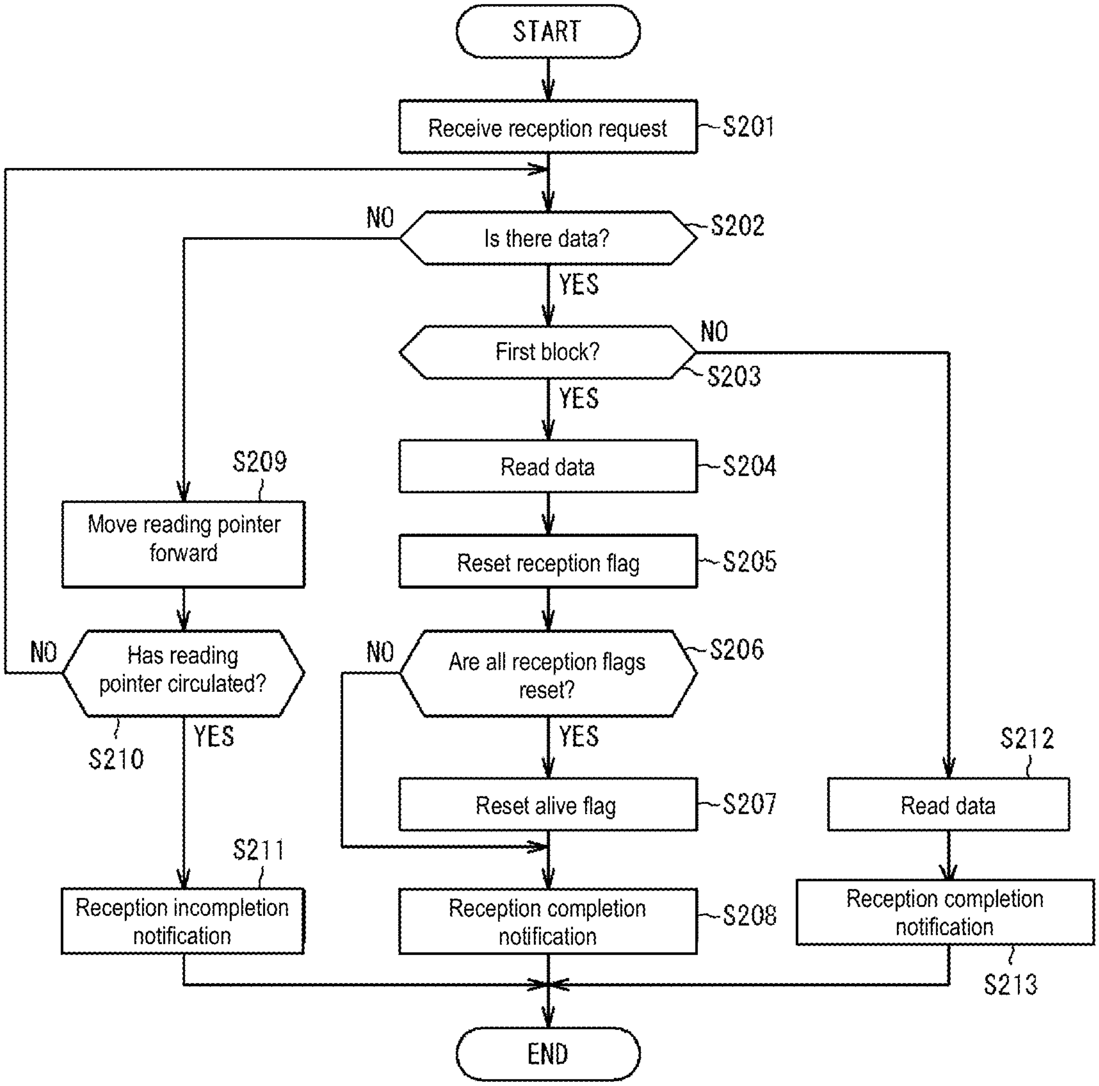
FIG. 6 is a flowchart showing the example of the control method according to an embodiment.

FIGS. 5 and 6 are flowcharts showing an example of a control method according to an embodiment. The flowchart shown in FIG. 5 shows an operation procedure (writing operation) of the management unit 12 when data is transmitted from the first virtual control device 21 to the buffer 19. The flowchart shown in FIG. 6 shows an operation procedure (reading operation) of the management unit 12 when data is transmitted from the buffer 19 to the second virtual control device 22 or the third virtual control device 23. These operation procedures are realized as a result of the management unit 12 reading the computer programs 15*a* from the storage unit 15 and executing various types of computation and processing. The order of steps shown in FIGS. 5 and 6 may be changed as appropriate.

FIG. 7 is a table showing an example of data D1 to D8 transmitted from the first virtual control device 21 to the buffer 19. Note that the data D1 to D8 are representative examples for comprehensively describing various patterns of the present disclosure, and do not necessarily match data actually transmitted from the first virtual control device 21. In the following example, the first virtual control device 21 transmits the data D1 to D8 in this order to the buffer 19. In this example, if data is not successfully transmitted to the buffer 19, the first virtual control device 21 retries transmission of the data a plurality of times until the data is successfully transmitted.

The data D1 and D2 are transmitted to both of the virtual control devices 22 and 23. The data D3, D4, and D7 are transmitted to only the third virtual control device 23. The data D5, D6, and D8 are transmitted to only the second virtual control device 22. In the table shown in FIG. 7, "1" indicates that the corresponding virtual control device 22 or 23 is the destination of the data, and "0" indicates that the corresponding virtual control device 22 or 23 is not the destination of the data.

The data D1 to D4 are "control data" regarding control of the vehicle V1. Examples of the control data include data for controlling units (e.g., the braking device, the door, the battery, the air conditioner, etc.) of the vehicle V1. In the case of control data, transmitting the data in real time (i.e., the virtual control devices 13 obtain the latest data) is more important than maintaining continuity of the data. For example, when the control data is data regarding the temperature in the vehicle, which is used to control the air conditioner, the current temperature in the vehicle is more important than time series data of the temperature in the vehicle from 10 minutes ago to 5 minutes ago. In such a case, it is allowable to erase past data by overwriting, so long as the virtual control device 13 can obtain the latest data.

The data D5 and D6 are "driving data" regarding driving control of the vehicle V1. The driving data is a subordinate concept of the control data. Examples of the driving data include data for controlling the braking device of the vehicle V1. The importance of transmitting the driving data in real time is higher than that of control data other than the driving data. For example, when the driving data is data for instructing the braking device to automatically apply the brakes, it is preferable that the driving data is obtained by the virtual control device 13 without delay.

The data D7 and D8 are update data for updating the units of the in-vehicle control device 1. Note that the data D7 and D8 may also be diagnosis data for diagnosing the in-vehicle control device 1 or streaming data such as audio or video data. That is, the data D7 and D8 are data whose continuity is important.

A writing target region R1 is set in advance for each of the data D2 to D8 in accordance with the type of data. The writing target region R1 indicates the type of block 19*a* that is initially pointed to by the writing pointer WP1. A first block 50 or a second block 60 is selected as the writing target region R1. In this example, the management unit 12 selects a first block 50 as the writing target region R1 in principle. The writing target region R1 of the data D2 to D5, D7, and D8 is a first block 50. Particularly when continuity of the data is important as in the cases of update data, diagnosis data, and streaming data, the management unit 12 selects a first block 50 as the writing target region R1 of the data.

On the other hand, when the data transmitted from the first virtual control device 21 is data (e.g., control data such as driving data) for which transmission in real time is particularly important, the management unit 12 may select a second block 60 as the writing target region R1 of the data. For example, the writing target region R1 of the data D6 is a second block 60.

Note that the writing target region R1 is not set for the data D1 in advance. In this case, a block 19*a* that is initially pointed to by the writing pointer WP1 when the data D1 is to be written is a writing target region R1. In FIG. 7, "1" indicates that the corresponding block can be a writing target region R1, and "0" indicates that the corresponding block cannot be a writing target region R1.

The predetermined value Th1 is set in advance for each of the data D1 to D8 in accordance with the type of data. The management unit 12 determines the predetermined value Th1 in accordance with the state of the vehicle V1. For example, the management unit 12 sets the predetermined value Th1 to a first value X1 when the vehicle V1 is in a stopped state, and sets the predetermined value Th1 to a second value X2 smaller than the first value X1 ($X2<X1$) when the vehicle V1 is in a driving state. In the example shown in FIG. 7, the management unit 12 sets the predetermined value Th1 of the data D1 to "3" when the vehicle V1 is in the stopped state, and to "1" when the vehicle V1 is in the driving state.

The predetermined value Th1 is a threshold for determining whether or not to switch the region into which the data is written, from a first block 50 to a second block 60 as described later, and the smaller the predetermined value Th1 is, the more likely the switching is performed. Most data transmitted and received while the vehicle V1 is driving is data whose transmission in real time is important. Therefore, in the following example, the predetermined value Th1 is set to the smaller second value X2 in the driving state to maintain transmission and reception of the latest data between the plurality of virtual control devices 13.

Also, the predetermined value Th1 is set such that the higher the importance of transmitting the data in real time is, the smaller the predetermined value Th1 becomes. For example, if the importance of transmitting the data in real time is higher in the order of the data D5 (driving data), D1 (control data), and D7 (update data), the predetermined values Th1 of the data D5, D1, and D7 in the stopped state are set to "2", "3", and "8", respectively.

Furthermore, if continuity of the data is important, the predetermined value Th1 may also be set to be larger than or equal to the maximum value to which the alive flag 58 can be set. For example, when the maximum value of the alive flag 58 is "255", the predetermined value Th1 of the data D8, whose continuity is important, may be set to "255". The relationship between the type of data and the writing target region R1 and the relationship between the type of data and the predetermined value Th1 such as those shown in FIG. 7 are stored as parameters in the storage unit 15 in advance, for example.

As shown in FIG. 5, the management unit 12 initially receives a "transmission request for the data D1" from the first virtual control device 21 (step S101). The transmission request for the data D1 includes various types of information (e.g., the data body, the destination, and the type of the data D1) for identifying the data D1 transmitted from the first virtual control device 21.

Next, the management unit 12 determines whether or not the writing target region R1 of the data D1 is a first block 50 (step S102). In step S102, the management unit 12 selects a block 19*a* as the writing target region R1 of the data D1 based on the transmission request. As shown in FIG. 7, either a first block 50 or a second block 60 may be selected as the writing target region R1 of the data D1, and therefore, the management unit 12 selects a block 19*a* (in this example, the leading first block 51) that is currently pointed to by the writing pointer WP1 as the writing target region R1.

In this example, the writing target region R1 of the data D1 is a first block 50 (YES in step S102), and therefore, the management unit 12 determines whether or not at least one of the first reception flag 56 and the second reception flag 57 has been set in all of the first blocks 51 to 54 (step S103). Specifically, the management unit 12 determines whether or not at least one of the first reception flag 56 and the second reception flag 57 has been set in the first block 50 (e.g., the first block 51) pointed to by the writing pointer WP1, and if at least one of the first reception flag 56 and the second reception flag 57 has been set, the management unit 12 moves the writing pointer WP1 to the next first block 50 (e.g., the first block 52).

If at least one of the first reception flag 56 and the second reception flag 57 has been set, the management unit 12 sequentially moves the writing pointer WP1 forward and confirms the states of the first reception flag 56 and the second reception flag 57 in each first block 50. Every time the writing pointer WP1 moves to the next block, the management unit 12 adds "1" to the alive flag 58 of the first block 50 that was pointed to. When the writing pointer WP1 returns again to the first block 50 (in this example, the first block 51) that was initially pointed to in step S103, the management unit 12 determines that at least one of the first reception flag 56 and the second reception flag 57 has been set in all of the first blocks 51 to 54 (YES in step S103), and proceeds to step S108.

In this example, the reception flags 56 and 57 of the first block 51, which is initially pointed to by the writing pointer WP1, have not been set (i.e., both are "0") in the initial state (the state shown in FIG. 4). Since both the first reception flag 56 and the second reception flag 57 have not been set in at least one first block 50 (NO in step S103), the management unit 12 proceeds to step S104.

Next, the management unit 12 writes the data D1 into the data storage unit 55 of the first block 51 pointed to by the writing pointer WP1 (step S104). Subsequently, the management unit sets the reception flags 56 and 57 of the first block 51 to "1" (step S105), adds "1" to the alive flag 58 of the first block 51, and moves the writing pointer WP1 to the next first block 52 (step S106).

Lastly, the management unit 12 transmits a "transmission completion notification" indicating that transmission of the data D1 from the first virtual control device 21 to the buffer 19 is complete to the first virtual control device 21 (step S107).

Upon receiving the transmission completion notification regarding the data D1, the first virtual control device 21 sequentially transmits transmission requests for the data D2, D3, and D4 to the management unit 12. The management unit 12 repeatedly executes steps S101 to S107 as described above for the data D2, D3, and D4 as well.

Figure 8:
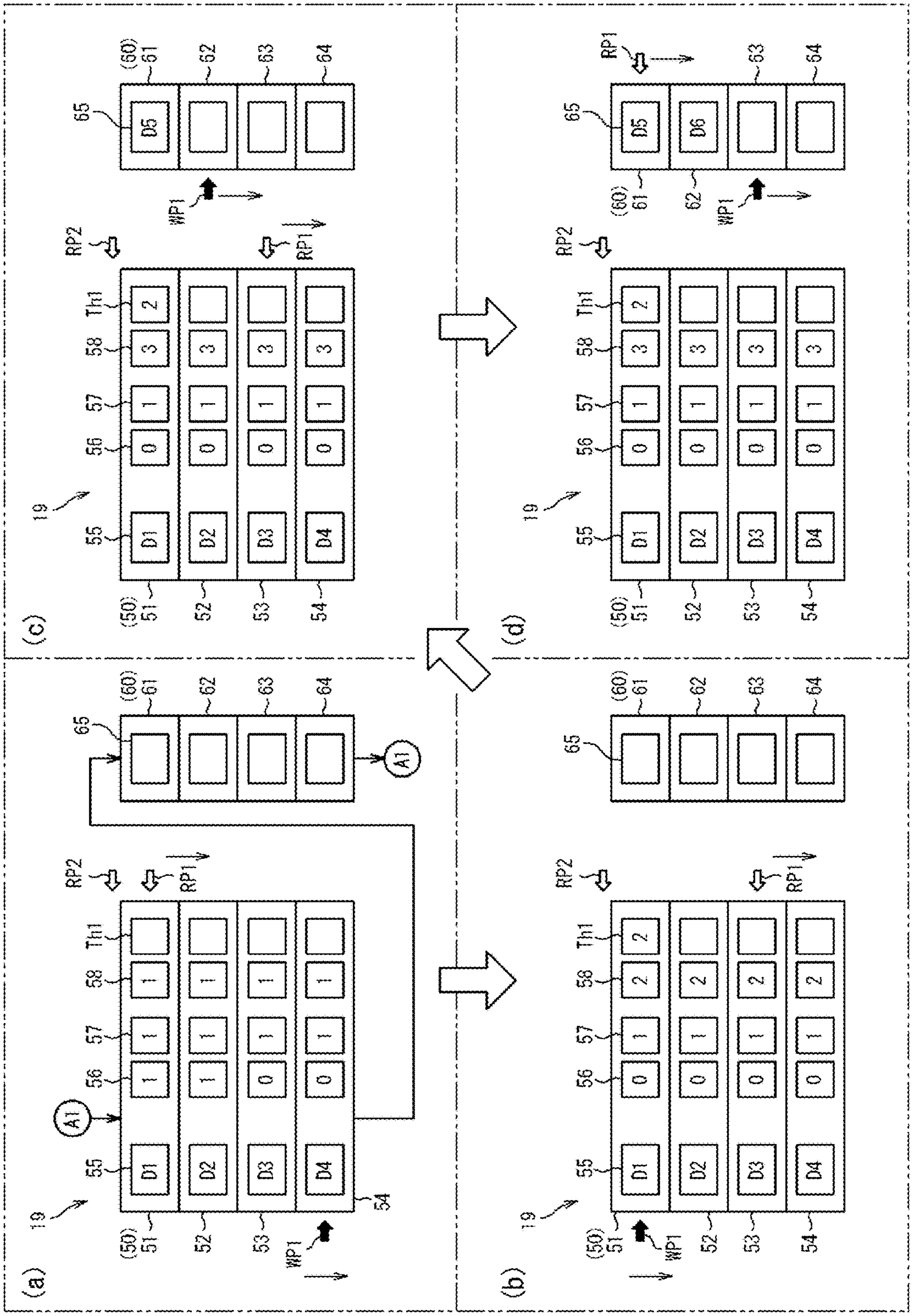
FIG. 8 schematically shows states of the buffer according to an embodiment in time series.

FIGS. 8(*a*),(*b*),(*c*), and (*d*) schematically show states of the buffer 19 according to the embodiment in time series. In this example, the writing pointer WP1 and the first reading pointer RP1 move normally. On the other hand, the second reading pointer RP2 pointing to the first block 51 does not move from the block 51 due to an abnormality occurring in the third virtual control device 23, for example.

FIG. 8(*a*) shows the state of the buffer 19 when writing of the data D1 to D4 into the buffer 19 is complete. That is, the management unit 12 stores the data D2 in the data storage unit 55 of the first block 52, sets the reception flags 56 and 57 of the first block 52 to "1", and adds "1" to the alive flag 58 of the first block 52. Then, the management unit 12 transmits a transmission completion notification regarding the data D2 to the first virtual control device 21.

Likewise, the management unit 12 stores the data D3 and D4 in the data storage units 55 of the first blocks 53 and 54, sets the second reception flags 57 of the first blocks 53 and 54 to "1", and adds "1" to the alive flags 58 of the first blocks 53 and 54. Then, the management unit 12 transmits transmission completion notifications regarding the data D3 and D4 to the first virtual control device 21.

Upon receiving the transmission completion notification regarding the data D4, the first virtual control device 21 transmits a transmission request for the data D5 to the management unit 12. The management unit 12 receives the transmission request for the data D5 (step S101).

The management unit 12 determines whether or not the writing target region R1 of the data D5 is a first block 50 (step S102). As shown in FIG. 7, only the first blocks 50 can be the writing target region R1 of the data D5, and therefore, if the block 19*a* currently pointed to by the writing pointer WP1 is a first block 50, the management unit 12 keeps the writing pointer WP1 at the first block 50, and if the block 19*a* currently pointed to by the writing pointer WP1 is a second block 60, the management unit 12 moves the writing pointer WP1 forward until the writing pointer WP1 points to the next first block 50. In this example, the writing pointer WP1 is pointing to the second block 61 after writing the data D4, and accordingly, the management unit 12 moves the writing pointer WP1 forward until the writing pointer WP1 points to the first block 51. Then, step S102 ends.

Since the writing target region R1 of the data D5 is a first block 50 (YES in step S102), the management unit 12 determines whether or not at least one of the first reception flag 56 and the second reception flag 57 has been set in all of the first blocks 51 to 54 (step S103). In this example, when step S103 is started regarding the data D5, the unread data D1 to D4 are stored in the first blocks 51 to 54, respectively, and at least one of the reception flags 56 and 57 has been set in each of the first blocks 51 to 54 as shown in FIG. 8(*a*).

Therefore, the management unit 12 sequentially moves the writing pointer WP1 and adds "1" to the alive flags 58 of the first blocks 50 that are pointed to. As a result, the alive flags 58 of the first blocks 51 to 54 are each set to "2" as shown in FIG. 8(*b*). Then, the writing pointer WP1 returns to the first block 51, which was initially pointed to in step S103. Therefore, the management unit 12 determines that at least one of the first reception flag 56 and the second reception flag 57 has been set in all of the first blocks 51 to 54 (YES in step S103), and proceeds to step S108.

Next, the management unit 12 determines the predetermined value Th1 for the data D5 (step S108). The management unit 12 determines the predetermined value Th1 based on the state of the vehicle V1 and the type of the data D5, for example. If the vehicle V1 is in the stopped state and the data D5 is "driving data", the management unit 12 sets the predetermined value Th1 to "2" as shown in FIG. 7. The management unit 12 stores the predetermined value Th1 in the first block 51, which is pointed to by the writing pointer WP1, for example. Then, step S108 ends. FIG. 8(*b*) shows the state of the buffer 19 at the end of step S108.

The management unit 12 determines whether or not the alive flag 58 of the first block 51 pointed to by the writing pointer WP1 has been set to a number larger than the predetermined value Th1 determined in step S108 (step S109). In this example, the alive flag 58 of the first block 51 has been set to "2", which is equal to the predetermined value Th1 "2", and therefore, the management unit 12 determines that this is not the case where "the alive flag 58 has been set to a number larger than the predetermined value Th1" (NO in step S109), and proceeds to step S110.

Next, the management unit 12 discards information including the data D5 (e.g., the transmission request for the data D5) received from the first virtual control device 21 (step S110). Thereafter, the management unit 12 transmits a "transmission incompletion notification" indicating that transmission of the data D5 from the first virtual control device 21 to the buffer 19 is not complete to the first virtual control device 21 (step S111).

Upon receiving the transmission incompletion notification regarding the data D5, the first virtual control device 21 again transmits a transmission request for the data D5 to the management unit 12. That is, the first virtual control device 21 retries transmission of the data D5. In this example, the first virtual control device 21 retries transmission of the data D5 without limitation on the number of times, but the first virtual control device 21 may cancel transmission of the data D5 upon receiving the transmission incompletion notification regarding the data D5 a predetermined number of times (e.g., larger than the predetermined value Th1 for the data D5).

The management unit 12 again receives a transmission request for the data D5 (step S101). The management unit 12 proceeds along the route of YES in step S102 and YES in step S103 as described above. In step S103, the management unit 12 adds "1" to the alive flags 58 of the first blocks 51 to 54 while the first blocks 51 to 54 are sequentially pointed to. As a result, the alive flags 58 of the first blocks 51 to 54 are set to "3" as shown in FIG. 8(*c*). Then, the writing pointer WP1 returns to the first block 51, which was initially pointed to in step S103, and the management unit 12 proceeds to step S108.

Subsequently, the management unit 12 determines the predetermined value Th1 for the data D5 (step S108). As in the previously performed step S108, if the vehicle V1 is in the stopped state, the management unit 12 sets the predetermined value Th1 to "2", and stores the predetermined value Th1 in the first block 51. On the other hand, if the vehicle V1 is in the driving state when step S108 is executed, for example, the management unit 12 sets the predetermined value Th1 to "1" as shown in FIG. 7. In this example, the vehicle V1 is in the stopped state, and therefore, the predetermined value Th1 is set to "2".

Next, the management unit 12 determines whether or not the alive flag 58 of the first block 51 has been set to a number larger than the predetermined value Th1 (step S109). In this example, the management unit 12 determines that the number "3" to which the alive flag 58 of the first block 51 has been set is larger than the predetermined value Th1 "2" (YES in step S109), and proceeds to step S112.

The management unit 12 writes the data D5 into the data storage unit 65 of a second block 60 (step S112). In step S112, the management unit 12 initially moves the writing pointer WP1 to a second block 60. For example, the management unit 12 moves the writing pointer WP1 to a second block 60 of which the data storage unit 65 was updated at the earliest date and time (i.e., a second block 60 storing the oldest data). If there are a plurality of second blocks 60 storing the oldest data, the management unit 12 moves the writing pointer WP1 to a second block 60 that is the closest to the leading side out of these second blocks 60. In this example, all of the data storage units 65 are empty in the initial state, and therefore, the management unit 12 moves the writing pointer WP1 to the second block 61.

Next, the management unit 12 writes the data D5 into the data storage unit 65 of the second block 60 (in this example, the second block 61) pointed to by the writing pointer WP1. When the writing processing is complete, the management unit 12 moves the writing pointer WP1 to the next block 19*a*. In this example, the management unit 12 moves the writing pointer WP1 from the second block 61 to the second block 62. Then, step S112 ends. FIG. 8(*c*) shows the state of the buffer 19 at the end of step S112.

The series of control executed by the management unit 12 from step S102 through steps S103, S108, and S109 to step S112 is "switching control" according to the present disclosure. The switching control makes it possible to write the latest data into the buffer by switching the region into which the data is written to a second block 60, in a case where the writing target region R1 of the data is a first block 50 but the writing pointer WP1 would otherwise circulate through the first blocks 50 (or the writing pointer WP1 stops moving from a predetermined block 19*a*) without writing the data because data is not normally read from the first blocks 50.

More specifically, the switching control is performed to write data transmitted from the first virtual control device 21 into a second block 60 (step S112) in a case where the writing target region R1 of the data transmitted from the first virtual control device 21 is a first block 50 (YES in step S102), at least one of the first reception flag 56 and the second reception flag 57 has been set in all of the first blocks 50 included in the buffer 19 (YES in step S103), and the alive flag 58 of the first block 50 pointed to by the writing pointer WP1 has been set to a number larger than the predetermined value Th1 (step S108 and YES in step S109).

By performing the switching control, the management unit 12 can store data transmitted from the first virtual control device 21 (in particular, data for which transmission in real time is important) in the buffer 19 while maintaining continuity of data stored in the first blocks 50.

After step S112, the management unit 12 transmits a transmission completion notification regarding the data D5 to the first virtual control device 21 (step S113). Upon receiving the transmission completion notification regarding the data D5, the first virtual control device 21 transmits a transmission request for the data D6 to the management unit 12.

The management unit 12 receives the transmission request for the data D6 (step S101). The writing target region R1 of the data D6 is a second block 60 as shown in FIG. 7 (NO in step S102), and accordingly, the management unit 12 writes the data D6 into a second block 60 (step S112).

In this example, the writing pointer WP1 is pointing to the second block 62, and accordingly, the management unit 12 writes the data D6 into the second block 62, and moves the writing pointer WP1 to the second block 63. FIG. 8(*d*) shows the state of the buffer 19 at the end of step S112 regarding the data D6. Thereafter, the management unit 12 transmits a transmission completion notification regarding the data D6 to the first virtual control device 21 (step S113).

Next, the following describes reading of data from the buffer 19 with reference to FIG. 6. The management unit 12 initially receives a "data reception request" transmitted from the second virtual control device 22, which is a recipient (step S201). The data reception request includes information indicating that the second virtual control device 22 can perform reception processing, for example.

Next, the management unit 12 determines whether or not data to be transmitted to the second virtual control device 22 is stored in the block 19*a* that is pointed to by the first reading pointer RP1 (step S202). If data to be transmitted to the second virtual control device 22 is stored (YES in step S202), the management unit 12 determines whether or not the block 19*a* is a first block 50 (step S203).

If data to be transmitted to the second virtual control device 22 is not stored in the block 19*a* pointed to by the first reading pointer RP1 (NO in step S202), the management unit 12 moves the first reading pointer RP1 to the next block (step S209). Steps S210 and S211 executed after step S209 will be described later.

As shown in FIG. 8(*a*), in this example, the data D1 to be transmitted to the second virtual control device 22 is stored in the block 19*a* (the first block 51) initially pointed to by the first reading pointer RP1 (YES in step S202), and the block 19*a* is the first block 51 (YES in step S203). Therefore, the management unit 12 reads the data D1 from the data storage unit 55 of the first block 51 for the second virtual control device 22 (step S204), and resets the first reception flag 56 of the first block 51 to "0" (step S205).

After step S205, the management unit 12 determines whether or not all of the reception flags 56 and 57 of the first block 51, from which the data D1 was read, have been reset (step S206). If all of the reception flags 56 and 57 of the first block 51 have been reset (YES in step S206), the management unit 12 resets the alive flag 58 of the first block 51 to "0" (step S207), and moves the first reading pointer RP1 to the first block 52.

If at least one of the reception flags 56 and 57 of the first block 51 is still set (NO in step S206), the management unit 12 skips step S207 (i.e., does not reset the alive flag 58 of the first block 51) and moves the first reading pointer RP1 to the first block 52. In this example, the second reception flag 57 of the first block 51 is still set to "1" after step S205 (NO in step S206), and therefore, the management unit 12 moves the first reading pointer RP1 to the first block 52 without resetting the alive flag 58. Then, the management unit 12 transmits a reception completion notification regarding the data D1 to the second virtual control device 22 (step S208).

Upon receiving the reception completion notification, the second virtual control device 22 transmits another data reception request to the management unit 12. The management unit 12 executes steps S201 to S208 as in the above-described case of the data D1. That is, the management unit 12 reads the data D2 from the first block 52 for the second virtual control device 22, resets the first reception flag 56 of the first block 52 to "0", moves the first reading pointer RP1 to the first block 53, and transmits a reception completion notification regarding the data D2 to the second virtual control device 22.

Subsequently, in response to a reception request from the second virtual control device 22 (step S201), the management unit 12 determines whether or not data to be transmitted to the second virtual control device 22 is stored in the first block 53 (step S202). In this example, the data D3 stored in the first block 53 is to be transmitted only to the third virtual control device 23, and therefore, data to be transmitted to the second virtual control device 22 is not stored in the first block 53 (NO in step S202). Accordingly, the management unit 12 moves the first reading pointer RP1 to the first block 54 (step S209). As for the reading operation, FIG. 8(*b*) shows the state of the buffer 19 at the end of step S209.

Next, the management unit 12 determines whether or not the first reading pointer RP1 has circulated through the buffer 19 once (step S210). Specifically, the management unit 12 determines whether or not the first reading pointer RP1 is pointing to the same block 19*a* (in this example, the first block 51) that was pointed to when step S202 was executed for the first time immediately after step S201.

If the first reading pointer RP1 has circulated through the buffer 19 once (YES in step S210), the management unit 12 determines that data to be transmitted to the second virtual control device 22 is not stored in any block 19*a* included in the buffer 19, and transmits a "reception incompletion notification" indicating that there is no data to be transmitted, to the second virtual control device 22 (step S211).

If the first reading pointer RP1 has not circulated through the buffer 19 once (NO in step S210), the management unit 12 returns to step S202 and determines whether or not data to be transmitted to the second virtual control device 22 is stored in the block 19*a* pointed to by the first reading pointer RP1.

In this example, the first reading pointer RP1 is pointing to the first block 54 after step S209, and accordingly, has not reached the first block 51 and has not circulated through the buffer. Therefore, the management unit 12 returns to step S202. Since data to be transmitted to the second virtual control device 22 is not stored in the first block 54 (NO in step S202), the management unit 12 moves the first reading pointer RP1 to the second block 61, and again returns to step S202 via step S210.

At this time, the writing operation has reached the state shown in FIG. 8(*c*), for example, and the data D5 to be transmitted to the second virtual control device 22 is stored in the second block 61 (YES in step S202). Since the data D5 is stored in the second block 61 (NO in step S203), the management unit 12 reads the data D5 stored in the data storage unit 65 of the second block 61 for the second virtual control device 22 (step 212). Thereafter, the management unit 12 moves the first reading pointer RP1 to the next second block 62, and transmits a reception completion notification regarding the data D5 to the second virtual control device 22 (step S213).

As for the reading operation, FIG. 8(*d*) shows the state of the buffer 19 at the end of step S213. As described above, the buffer 19 is partitioned into the first blocks 50 and the second blocks 60, and therefore, even if the second reading pointer RP2 pointing to a predetermined block 19*a* does not move from the block, the management unit 12 can write new data D5 transmitted from the first virtual control device 21 into a second block 60 in the buffer 19, and read the data D5 from the second block 60 for the second virtual control device 22.

That is, even if an abnormality occurs in the third virtual control device 23, the in-vehicle control device 1 according to the embodiment and the control method thereof make it possible to continue data transmission and reception between the first virtual control device 21 and the second virtual control device 22. Consequently, the reliability of the in-vehicle control device 1 can be improved.

Figure 9:
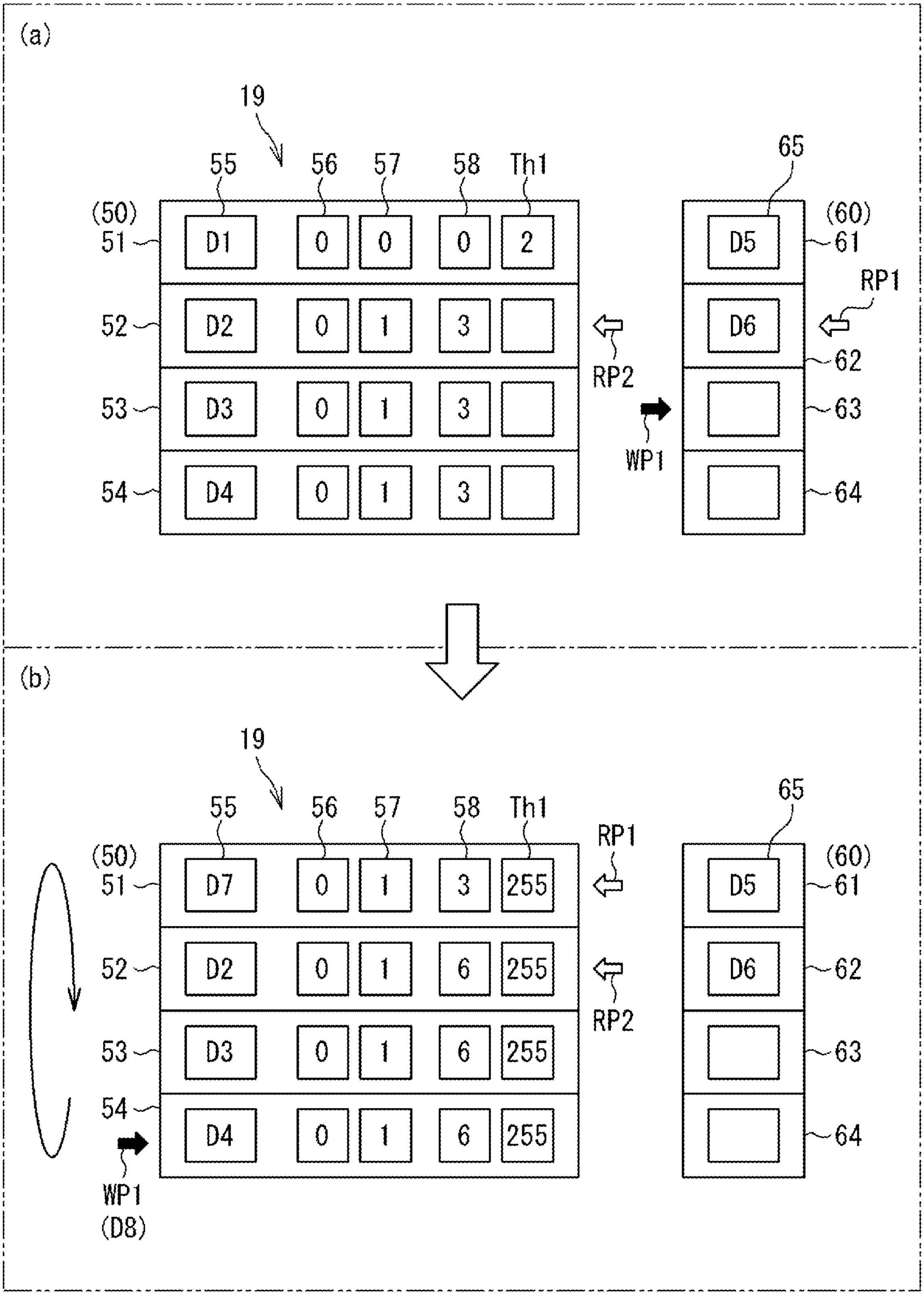
FIG. 9 schematically shows states of the buffer according to an embodiment in time series.

Next, the following describes transmission and reception of data D7 and D8 with reference to FIGS. 5, 6, and 9. FIGS. 9(*a*) and (*b*) schematically show states of the buffer 19 according to the embodiment, next to the state shown in FIG. 8(*d*) in time series.

In this example, the abnormality in the third virtual control device 23 is once resolved after the states shown in FIG. 8, and the third virtual control device 23 transmits a data reception request to the management unit 12. In response to the reception request from the third virtual control device 23, the management unit 12 executes the control method shown in FIG. 6 to read the data D1 for the third virtual control device 23. That is, the management unit 12 receives the reception request from the third virtual control device 23 (step S201), and determines that the data D1 to be transmitted to the third virtual control device 23 is stored in the first block 51, which is pointed to by the second reading pointer RP2 (YES in step S202).

Since the data D1 is stored in the first block 51 (YES in step S203), the management unit 12 reads the data D1 for the third virtual control device 23 (step S204) and then resets the second reception flag 57 of the first block 51 (step S205). As a result, both of the reception flags 56 and 57 of the first block 51 are reset (both are "0") (YES in step S206), and accordingly, the management unit 12 resets the alive flag 58 of the first block 51 to "0" (step S207), moves the second reading pointer RP2 to the first block 52, and transmits a reception completion notification regarding the data D1 to the third virtual control device 23 (step S208). FIG. 9(*a*) shows the state of the buffer 19 at the end of step S208.

In this example, an abnormality thereafter occurs again in the third virtual control device 23, and the second reading pointer RP2 pointing to the first block 52 stops moving from this block (a reception request from the third virtual control device 23 is not transmitted).

On the other hand, the first virtual control device 21, which is the transmitter, sequentially transmits transmission requests for the data D7 and D8 to the buffer 19 after receiving the transmission completion notification regarding the data D6. As shown in FIG. 5, upon receiving the transmission request for the data D7 (step S101), the management unit 12 selects a first block 50 as the writing target region R1 of the data D7 as shown in FIG. 7, and moves the writing pointer WP1 from the second block 60 to the first block 51 (step S102). Since both of the reception flags 56 and 57 of the first block 51 are "0", i.e., have not been set (NO in step S103), the management unit 12 writes the data D7 into the data storage unit 55 of the first block 51 (step S104).

Thereafter, the management unit 12 sets the second reception flag 57 of the first block 51 to "1" (step S105), changes the alive flag 58 from "0" to "1" by adding "1" to the alive flag 58 and moves the writing pointer WP1 to the next first block 52 (step S106), and transmits a transmission completion notification regarding the data D7 (step S107).

Subsequently, the management unit 12 receives the transmission request for the data D8 from the first virtual control device 21 (step S101). As shown in FIG. 7, the writing target region R1 of the data D8 is a first block 50, and therefore, the writing pointer WP1 continues pointing to the first block 52 (step S102). In the state after the data D7 was written, the second reception flag 57 has been set to "1" in all of the first blocks 51 to 54 (YES in step S103), and therefore, the management unit 12 sets the predetermined value Th1 for the data D8 to "255" as shown in FIG. 7 (step S108).

Then, the management unit 12 stores the predetermined value Th1 in the first block 52, which is currently pointed to, and determines whether or not the alive flag 58 of the first block 52 has been set to a number larger than the predetermined value Th1 (step S109). As described above, "255" is the maximum value to which the alive flag 58 can be set in this example, and therefore, the result of the determination in step S109 is always "NO" regarding the data D8. Accordingly, the management unit 12 discards the data D8, adds "1" to the alive flag 58 of the first block 52, and moves the writing pointer WP1 to the next first block 53 (step S110). Thereafter, the management unit 12 transmits a transmission incompletion notification regarding the data D8 to the first virtual control device 21 (step S111).

Upon receiving the transmission incompletion notification regarding the data D8, the first virtual control device 21 again transmits a transmission request for the data D8 to the management unit 12. Upon receiving the transmission request for the data D8 again (step S101), the management unit 12 executes control in the order of steps S102, S103, and S108 to S111 as described above. Since the predetermined value Th1 for the data D8 is larger than or equal to the maximum value of the alive flag 58, the writing pointer WP1 for writing the data D8 endlessly circulates through the first blocks 51 to 54 unless any of the second reception flags 57 is reset to "0".

FIG. 9(*b*) shows the state of the buffer 19 when the writing pointer WP1 for writing the data D8 has circulated through the first blocks 51 to 54 a plurality of times (e.g., three times). As shown in FIG. 7, the data D8 is update data, whose continuity is important. If the data D8 is stored in a second block 60, there is a risk that continuity of the data may not be maintained due to the data D8 being overwritten without being read for the second virtual control device 22 or the data D8 being read earlier than preceding data or later than following data.

In this example, the predetermined value Th1 for the data D8 is set to be larger than or equal to the maximum value of the alive flag 58, and therefore, the switching control is not executed for the data D8. That is, the data D8, which should be written into a first block 50, can be kept from being written into a second block 60. With this configuration, it is possible to maintain continuity of the data D8 while maintaining transmission and reception of data such as the data D5, for which transmission in real time is important. Accordingly, the reliability of the in-vehicle control device 1 can be further improved.

Virtual Analysis Device

When executing the switching control, the management unit 12 reads data stored in the data storage unit 55 of the first block 50 that is pointed to by the writing pointer WP1 in step S109, and transmits the data to the virtual analysis device 24.

For example, the writing pointer WP1 points to the first block 51 in step S109 and the number "3" to which the alive flag 58 of the first block 51 is set is larger than the predetermined value Th1 "2" as shown in FIG. 8(*c*), and therefore, the management unit 12 switches the region into which the data D5 is written to a second block 60. At this time, the management unit 12 reads the data D1 stored in the first block 51 and transmits the data to the virtual analysis device 24.

The data D1 is data to be read by the virtual control device 23 having an abnormality, and therefore, can be used to analyze the abnormality occurring in the virtual control device 23. By transmitting such data to the virtual analysis device 24, the management unit 12 can increase the accuracy of abnormality analysis.

Variations

The following describes variations of the embodiment. In the variations, the same structures as those in the embodiment are denoted by the same reference numbers as those used in the embodiment to avoid redundant descriptions thereof.

In the above embodiment, each first block 50 includes the alive flag 58, and the management unit 12 executes the switching control only when the alive flag 58 is larger than the predetermined value Th1. However, when all of the first blocks 51 to 54 are filled (i.e., at least one of the first reception flag 56 and the second reception flag 57 has been set), the management unit 12 may execute the switching control irrespective of the number to which the alive flag 58 is set. That is, when the result of the determination in step S103 is YES, the management unit 12 may skip steps S108 and S109 and directly execute step S112.

According to this configuration, the switching control can be executed earlier, and therefore, this configuration is suitable when the importance of transmission in real time is higher as for data transmitted from the first virtual control device 21.

Supplementary Note

Note that at least some features of the above embodiment may be combined as appropriate. The disclosed embodiment is an illustrative example in all aspects and should not be considered as restrictive. The scope of the present disclosure is defined by the claims, and is intended to encompass all modifications within the meanings and scope that are equivalent to the claims.

The invention claimed is:

1. An in-vehicle control device installed in a vehicle, comprising:

physical resources including a control unit and a storage unit; and a management unit configured to generate a plurality of virtual control devices by allocating the physical resources, wherein the management unit includes a buffer for temporarily storing data that is transmitted from a first virtual control device of the plurality of virtual control devices and to be received by at least one of a second virtual control device and a third virtual control device of the plurality of virtual control devices, the buffer is partitioned into a plurality of blocks through which a writing pointer, a first reading pointer, and a second reading pointer each circulate, the writing pointer indicating a position at which data transmitted from the first virtual control device to the buffer is written, the first reading pointer indicating a position at which data to be transmitted from the buffer to the second virtual control device is read, and the second reading pointer indicating a position at which data to be transmitted from the buffer to the third virtual control device is read, the plurality of blocks include first blocks for which overwriting of data is prohibited and second blocks for which overwriting of data is allowed, each of the first blocks includes:

a first reception flag that is set in response to data from the first virtual control device being written and is reset in response to the data being read by the second virtual control device; and a second reception flag that is set in response to data from the first virtual control device being written and is reset in response to the data being read by the third virtual control device;

the management unit executes switching control for writing data transmitted from the first virtual control device into a second block when a writing target region of the data transmitted from the first virtual control device is a first block, and the switching control is executed when at least one of the first reception flag and the second reception flag has been set in all of the first blocks included in the buffer.

2. The in-vehicle control device according to claim 1, wherein each of the first blocks further includes an alive flag that is set to a number corresponding to the number of times the writing pointer has pointed to the first block, and is reset in response to both the first reception flag and the second reception flag being reset, and the management unit executes the switching control when the alive flag of the first block has been set to a number larger than a predetermined value.

3. The in-vehicle control device according to claim 2, wherein the management unit determines the predetermined value in accordance with a state of the vehicle.

4. The in-vehicle control device according to claim 3, wherein the management unit sets the predetermined value to a first value when the vehicle is in a stopped state, and sets the predetermined value to a second value that is smaller than the first value when the vehicle is in a driving state.

5. The in-vehicle control device according to claim 2, wherein the management unit sets the predetermined value to a value larger than or equal to the maximum value of the alive flag when data transmitted from the first virtual control device is update data for updating the in-vehicle control device, diagnosis data for diagnosing the in-vehicle control device, or audio or video streaming data.

6. The in-vehicle control device according to claim 2, wherein the plurality of virtual control devices include a virtual analysis device for analyzing an abnormality occurring in at least one of the second virtual control device and the third virtual control device, and when the alive flag of the first block has been set to a number larger than the predetermined value, the management unit reads data stored in the first block and transmits the data to the virtual analysis device.

7. The in-vehicle control device according to claim 1, wherein the management unit selects a first block or a second block as the writing target region depending on the type of data transmitted from the first virtual control device.

8. The in-vehicle control device according to claim 7, wherein the management unit selects a second block as the writing target region when data transmitted from the first virtual control device is data regarding control of the vehicle.

9. The in-vehicle control device according to claim 7, wherein the management unit selects a first block as the writing target region when data transmitted from the first virtual control device is update data for updating the in-vehicle control device, diagnosis data for diagnosing the in-vehicle control device, or audio or video streaming data.

10. A control method for controlling an in-vehicle control device installed in a vehicle, the method comprising:

a generating step of generating a plurality of virtual control devices by allocating physical resources including a control unit and a storage unit; and a storing step of temporarily storing, in a buffer, data that is transmitted from a first virtual control device of the plurality of virtual control devices and to be received by at least one of a second virtual control device and a third virtual control device of the plurality of virtual control devices, wherein the buffer is partitioned into a plurality of blocks through which a writing pointer, a first reading pointer, and a second reading pointer each circulate, the writing pointer indicating a position at which data transmitted from the first virtual control device to the buffer is written, the first reading pointer indicating a position at which data to be transmitted from the buffer to the second virtual control device is read, and the second reading pointer indicating a position at which data to be transmitted from the buffer to the third virtual control device is read, the plurality of blocks include first blocks for which overwriting of data is prohibited and second blocks for which overwriting of data is allowed, each of the first blocks includes:

a first reception flag that is set in response to data from the first virtual control device being written and is reset in response to the data being read by the second virtual control device; and a second reception flag that is set in response to data from the first virtual control device being written and is reset in response to the data being read by the third virtual control device, the storing step includes a switching step of writing data transmitted from the first virtual control device into a second block when a writing target region of the data transmitted from the first virtual control device is a first block, and the switching step is executed when at least one of the first reception flag and the second reception flag has been set in all of the first blocks included in the buffer.

11. A computer program for controlling an in-vehicle control device installed in a vehicle, the computer program causing a computer to execute:

a generating step of generating a plurality of virtual control devices by allocating physical resources including a control unit and a storage unit; and a storing step of temporarily storing, in a buffer, data that is transmitted from a first virtual control device of the plurality of virtual control devices and to be received by at least one of a second virtual control device and a third virtual control device of the plurality of virtual control devices, wherein the buffer is partitioned into a plurality of blocks through which a writing pointer, a first reading pointer, and a second reading pointer each circulate, the writing pointer indicating a position at which data transmitted from the first virtual control device to the buffer is written, the first reading pointer indicating a position at which data to be transmitted from the buffer to the second virtual control device is read, and the second reading pointer indicating a position at which data to be transmitted from the buffer to the third virtual control device is read, the plurality of blocks include first blocks for which overwriting of data is prohibited and second blocks for which overwriting of data is allowed, each of the first blocks includes:

a first reception flag that is set in response to data from the first virtual control device being written and is reset in response to the data being read by the second virtual control device; and a second reception flag that is set in response to data from the first virtual control device being written and is reset in response to the data being read by the third virtual control device, the storing step includes a switching step of writing data transmitted from the first virtual control device into a second block when a writing target region of the data transmitted from the first virtual control device is a first block, and the switching step is executed when at least one of the first reception flag and the second reception flag has been set in all of the first blocks included in the buffer.

* * * * *